United States Patent

[11] 3,567,021

[72] Inventor Daniel P. Morisseau, Jr.
1972 Rayner Road, Kirkwood, Mo. 63122
[21] Appl. No. 022,500
[22] Filed Mar. 25, 1970
[45] Patented Mar. 2, 1971

[54] WASTE TREATMENT SYSTEM
15 Claims, 4 Drawing Figs.
[52] U.S. Cl. .................................................. 210/195, 210/208
[51] Int. Cl. .................................................. C02c 5/10
[50] Field of Search.......................................... 210/195, 197, 208, 219, 220, 221, 521, 522

[56] References Cited
UNITED STATES PATENTS
3,353,676  11/1967  Hirsch .......................... 210/208X
3,487,017  12/1969  Thorn et al. .................. 210/208X Primary Examiner—J. L. DeCesare
Attorney—Richard G. Heywood ABSTRACT: A waste treatment system having a spherical aeration chamber with a lower influent receiving zone and an upper mixing zone in which aeration and recirculation of influent is effected by a double impellor, vertical baffles being provided to prevent vortex action within the aeration chamber. The spherical chamber is positioned in a settling chamber having baffles in the lower compartment, and diverging effluent outlet pipes to a final treatment chamber and a skimmer to return any floating particles to the mixing zone.

PATENTED MAR 2 1971 3,567,021

INVENTOR:
DANIEL P. MORISSEAU JR.
BY Richard G. Heywood
ATTORNEYS.

INVENTOR:
DANIEL P. MORISSEAU Jr.
BY
Richard G. Heywood
ATTORNEYS.

WASTE TREATMENT SYSTEM

BACKGROUND OF THE INVENTION

This invention relates generally to a waste water treatment system and more particularly to a treatment unit utilizing an improved activated sludge process for treating raw sewage and like waste water and discharging an effluent that creates no water pollution problem.

Water pollution is recognized as one of the major national problems and intensive efforts are being made by government agencies, industry and concerned citizen groups toward solutions to the various aspects of this problem. Industrial wastes from chemical, textile, food processing and other industries are a primary source of organic pollution. However, an equally important source results from so-called domestic sewage from individual households, subdivisions, shopping centers and light industry in urban or rural areas in which widespread soil and water contamination is produced through the lack of proper public sewers and sewage treatment plants, and through the use of septic tanks. In addition to efforts being made to control or regulate the major industrial waste problem, it is important that individual households and small industry be required to discontinue septic tank use and adopt improved waste water treatment techniques.

There are several different processes for the biological treatment of waste water and one of the most widely used and versatile is the activated sludge process in which waste water containing biologically degradable compounds is aerated or mixed with aerobic bacteria and other micro-organisms so that waste solids are digested by bacteria (aerobic fermentation) activated by the oxygen from the air. The floc of settleable solids (activated sludge) includes bacteria and residual solids, which upon settling produce a clear effluent low in organic content.

SUMMARY OF THE INVENTION

The invention is embodied in a waste treatment unit recirculating influent during extensive aeration to provide improved aerobic digestion of solids and a clear odorless effluent.

A principal object of the present invention is to provide an improved waste treatment system employing the activated sludge process with improved aeration to produce a clear odorless effluent low in organic content. Another object is to provide an efficient treatment plant suitable for processing waste water from facilities having several occupants, such as homes, small factories and the like. Another object is to provide a treatment unit that is easily installed and serviced, economical, and yet is efficient, durable and quiet in operation. Still another object is to provide a waste treatment system which produces a clear, odorless and low organic content effluent that will not pollute soil or water resources.

These and other objects and advantages will become more apparent hereinafter.

BRIEF DESCRIPTION OF THE DRAWINGS

For purposes of illustration and disclosure, the invention is embodied in the parts and in the arrangements and combinations of parts hereinafter described and claimed.

In the accompanying drawings which form part of the specification and wherein like numerals refer to like parts wherever they occur.

DESCRIPTION OF THE PREFERRED EMBODIMENT

The waste treatment system of the present invention provides an improved activated sludge process for treating waste water or sewage from a house, shop, small factory or like facility, the treatment unit 10 being connected to receive the influent by gravity flow.

Figure 1:
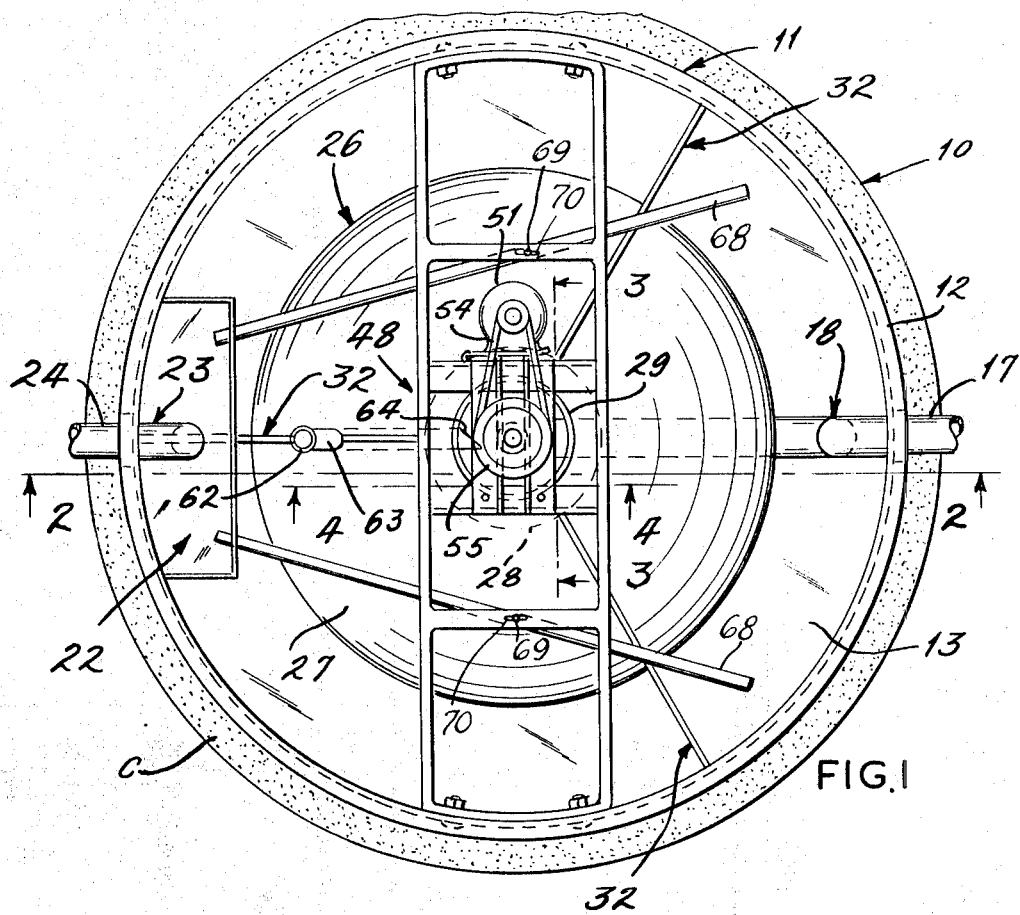
FIG. 1 is a top plan view of a waste water treatment system embodying the present invention.
Figure 2:
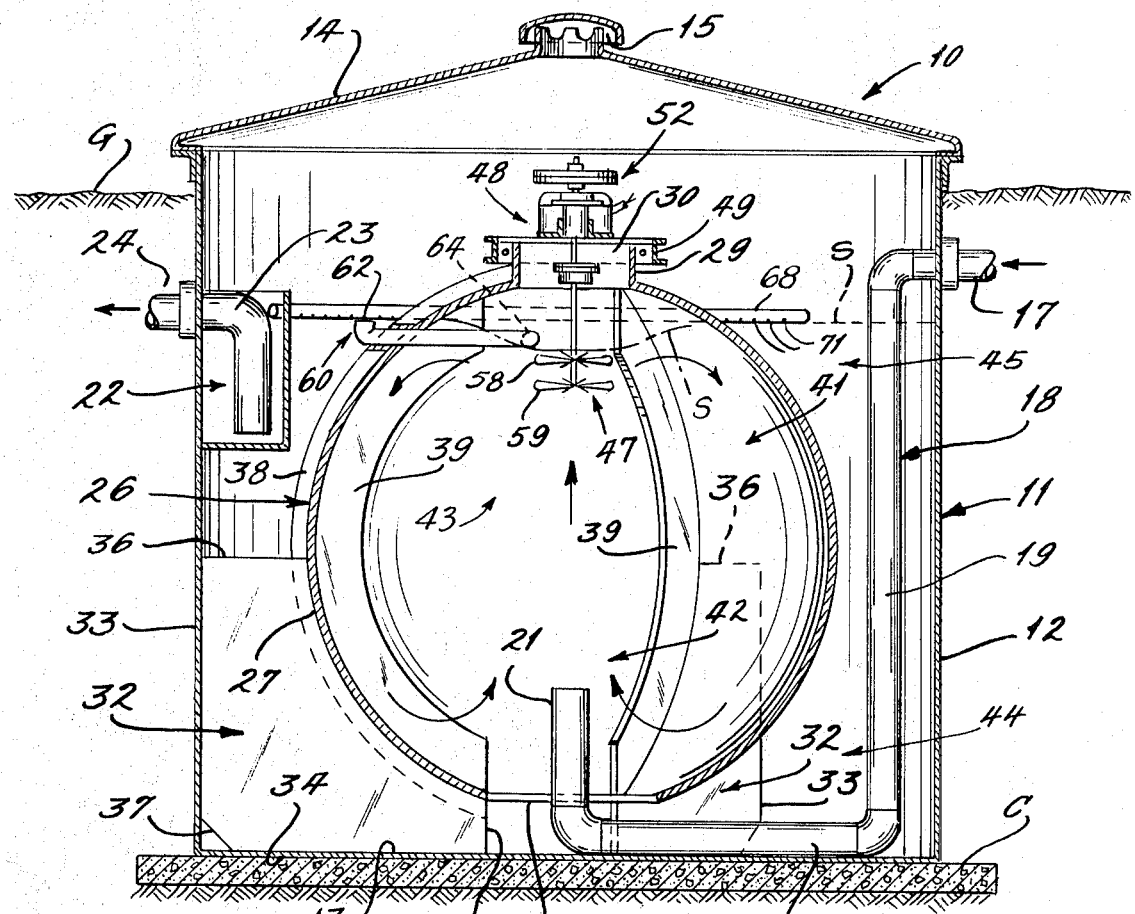
FIG. 2 is a vertical cross-sectional view taken substantially along line 2—2 of FIG. 1.

Referring to FIGS. 1 and 2 of the drawings, the treatment unit 10 comprises a cylindrical tank 11 set into the ground G upon a horizontal concrete pad C, the tank having a cylindrical sidewall 12 and bottom wall 13 and being closed by a removable cover 14 with ventilator and fresh air intake 15. Influent from the facility is received through sewer pipe 17 and inlet pipe 18 having a vertical section 19, horizontal section 20 extending radially to the center of the tank 11 along the bottom 13, and a short vertical section 21 to discharge the influent upwardly in the center. However, it may be desirable to provide gravity flow of influent directly into the side of the mixing chamber 41 through angular inlet pipe connection (not shown). The clear effluent resulting from the process is taken off from a final treatment chamber 22 (to be discussed hereinafter) through outlet pipe 23 and discharge conduit 24, which may lead to a stream or natural surface water concourse inasmuch as the effluent is clear and organically acceptable for such discharge.

Centrally positioned within the cylindrical tank 11 is a substantially spherical tank 26 having a spherical or arcuate sidewall 27 formed with a central bottom opening 28 and a cylindrical top extension 29 defining an air intake opening 30. The spherical tank 26 may be formed of any suitable material, such as fiberglass or other plastic, metal or the like, and is positioned centrally of the sidewall 12 and spaced above the bottom wall 13 by radially disposed baffles 32, three being shown for disclosure purposes. The baffles 32 are secured to or molded integral with the sidewall 27 of the sphere and have outer and lower margins 33 and 34 engaged with the main tank 11, vertical inner margins 35 aligned with the bottom opening 28 of the spherical tank 26, horizontal upper margins 36 and diagonal margins 37 to provide peripheral communication between lower portions of the main tank 11 separated by such baffles 32. The spherical tank 26 is also provided with outstanding strengthening ribs 38, and internal vertical ribs or baffles 39 of substantial radial depth extend inwardly from the bottom opening 28 to adjacent the top extension 29.

The interior of the spherical chamber 26 defines an aeration and mixing chamber 41 having a lower influent receiving zone 42 and an upper mixing zone 43. Between the spherical tank 26 and main tank 11 is formed a lower settling chamber 44 extending to the upper margins 36 of the baffles 32, which define the narrowest portion of the outer tank area, and an upper settling and clarification chamber 45 is formed above the lower chamber 44.

Figure 3:
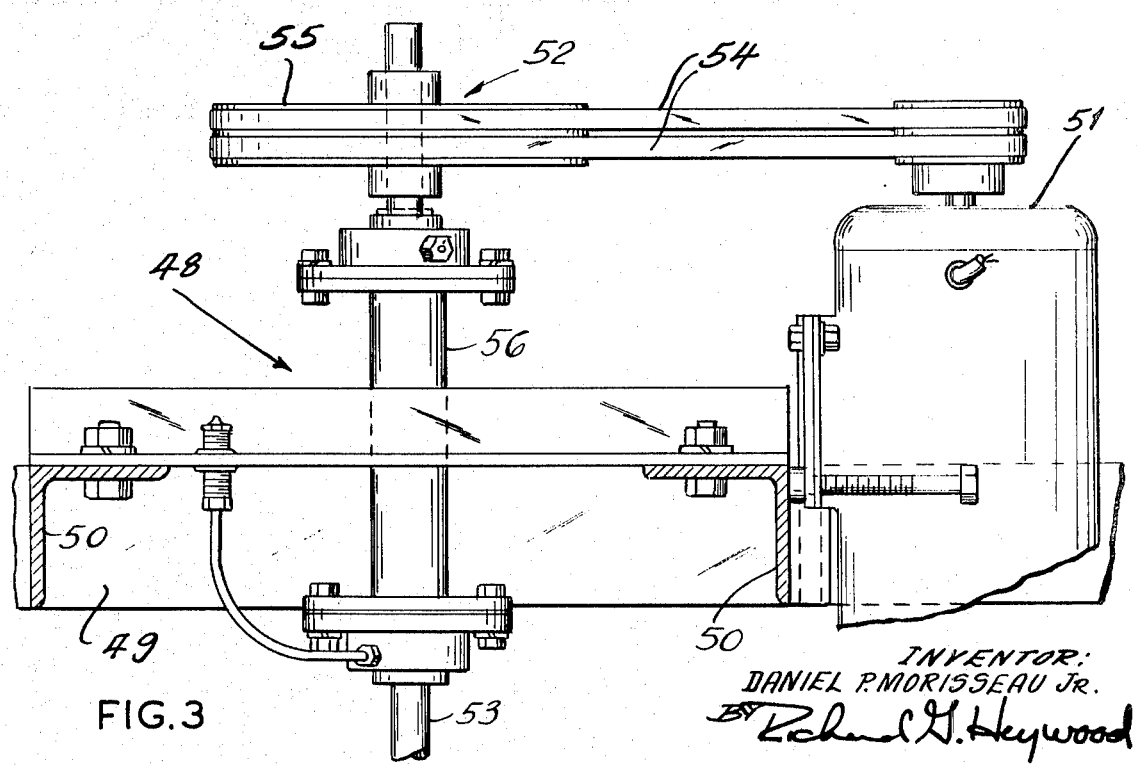
FIG. 3 is an enlarged fragmentary view, partly in section, taken along line 3—3 of FIG. 1.
Figure 4:
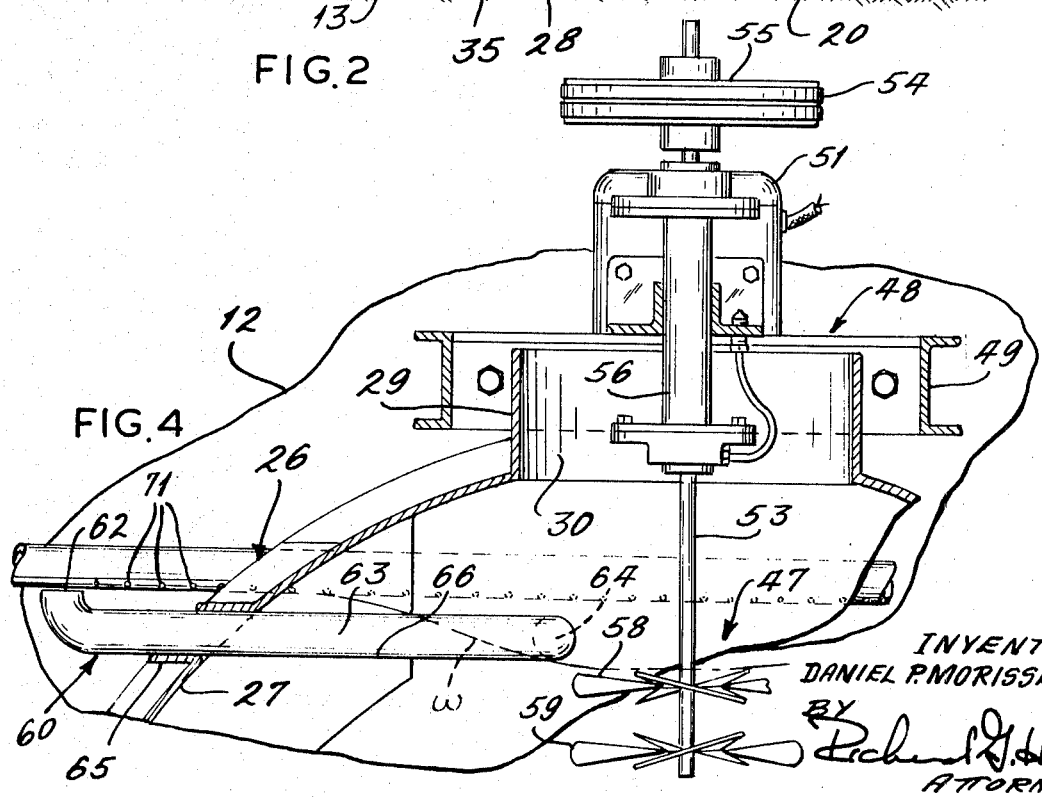
FIG. 4 is an enlarged fragmentary view, partly in section, taken along line 4—4 of FIG. 1.

Aeration (air induction) and mixing to implement aerobic digestion of solids in the influent is accomplished by a novel double impellor means 47 located in the mixing zone 43. A rigid support bridge 48 formed of longitudinal and cross beams 49 and 50 spans the top of the main tank 11 and supports a motor 51 and drive train 52 to impellor shaft 53 journaled in suitable bearings. As shown best in FIGS. 3 and 4, the drive train 52 includes a double belt 54 for pulley 55 secured on the upper end of the impellor shaft 53 and the bearing structure comprises a vertical sleeve 56 secured on the crossframe beams 50 and having bushings (not shown) at each end thereof.

The double impellor means 47 comprises an upper or air entrainment impellor 58 and a lower or circulation impellor 59, both being secured 4 53 for conjoint rotation in the same direction (clockwise as viewed in FIG. 1). The blades 58 and 59 are identical, but reversely mounted on the shaft 53, i.e., one blade is inverted relative to the other, to provide opposite directions of thrust and a high state of turbulence and air mixing therebetween. The size, spacing and positioning of the impellor blades is predetermined and critical for proper operation. For instance, optimum performance has been achieved using an 8 inch diameter, four blade impellor means in which the centerline spacing between impellors 58 and 59 is one-fourth the diameter or 2 inches and in which the depth of immersion from the static water line S is one-half the diameter of 4 inches to the centerline of the upper impellor 58. As will become more apparent hereinafter, during impellor operation a cavitation or curvilinear wave line W is formed in the mixing zone 43 of the aeration chamber 41 drawing the central area of the water line downwardly to adjacent the upper impellor 58 and tending to form a vortex action within the spherical tank 26. However, the internal baffles 39 stabilize and prevent such action and redirect the circulation within the aeration chamber 41 into substantially vertical flow paths illustrated by arrows in FIG. 2.

The external baffles 32 in the lower settling chamber 44, together with the external ribs 38 on the sphere and the narrowing water passage formed between the settling chambers 44 and 45 by the spherical sidewall 27 stabilize water in the settling chambers and provide an essentially quiescent upper discharge water condition except for surface skimming, as will now be discussed.

The upper settling chamber 45 of the main tank 11 is provided with a skimmer apparatus 60 comprising an L-shaped pipe having a short vertical section 61 with an open end 62 adjacent to or just below the static water level S in both the upper settling chamber 45 and the mixing zone 43 of the spherical tank 26, and a horizontal section 63 extending into the mixing zone 43 with an open end 64 positioned above the upper impellor 58 and cavitation line W. It will be noted in FIG. 4 that the skimmer 60 is supported in position by the spherical tank 26, the sidewall 27 and the outer rib 38 having a sleeve fitting 65 for the horizontal section 63 and inner baffle 39 may be slotted as shown at 66 to receive the horizontal section 63. If desired, a V-shaped support (not shown) may support the skimmer section 63 or it may be otherwise suitably attached to the spherical tank 26. The open end 64 is beveled (FIG. 1) away from the direction of impellor rotation to prevent agitation of waste water by the impellors from entering the skimmer 60.

Clarified effluent is removed from the quiescent upper settling chamber 45 through a pair of discharge conduits 68 extending from the upper portion of the final treatment chamber 22 divergently outwardly across the main tank 11, FIG. 1. These conduits 68 are also secured to the support bridge 48 by vertically adjustable means 69 comprising bolts extending upwardly through elongated slots 70 and fastened in place by nuts. The angularity of the conduits 68 and adjustment thereof permits this effluent removal device to be leveled regardless of any angular deviations in installing the main tank 11. The conduits 68 are perforated with a series of spaced discharge openings 71 along the lower sides thereof on a horizontal line that is just above the open end 62 of the skimmer 60 and determines the static water level S.

The final treatment chamber 22 is provided for the purpose of chlorination or other chemical treatment as a further means of purifying the affluent before it is discharged, particularly in more heavily populated areas or in compliance with local laws.

In operation, waste water from the facility including raw sewage is discharged directly into the mixing chamber 41 through inlet pipe 18 and creates a surge condition toward increase of the static water level S. The waste water is circulated in the mixing chamber 41 by the impellor means 47 which break up solid waste and thoroughly aerate this matter whereby aerobic bacteria rapidly changes sewage organics into new bacteria and recirculation of a portion of this activated sludge within the mixing chamber is continued. The remainder of this sludge or floc of residual solid particles and micro-organisms will settle out downwardly along the arcuate sidewall 27 of the chamber 41 and pass through the opening 28 and outwardly along the bottom wall 13 of the main tank 11. As stated, the internal baffles 39 have a substantial depth to prevent vortex action and stabilize the circulation path of liquid to move from the impellors outwardly and downwardly along the interior sidewall 27 which, being spherical, has an increasing area resulting in a decreasing velocity. The outer baffles 32 also assist in preventing any residual tendency for rotation of liquid in the tank and the surge effect within the lower and upper settling chambers 44 and 45 is further dampened by the narrowing upward passage formed between the spherical outer sidewall 27 and the main tank wall 12. In other words, the shape of the settling and clarification chamber is such that there is a velocity gradient providing an extremely low flow rate in the larger bottom area 13 to prevent agitation or lifting of sludge from the bottom and, similarly, a diminishing flow rate is effected in the upper chamber 45 so that the effluent surface area S is essentially quiescent.

The increased liquid content of the unit 10 will, of course, raise the static water level and clear effluent will be discharged through the outlet conduits 68 while a surface current is established across the top to the skimmer 60 for returning any floating particles back to the mixing and aeration chamber 43; it being noted that the skimmer discharge 64 is above the waste water cavitation wave line.

I claim:

1. A waste treatment plant for biologically treating waste water including raw sewage, comprising inner tank means having a sidewall defining therein an aeration and mixing chamber with a lower influent receiving zone and an upper mixing zone exposed to the atmosphere, double impellor means disposed in said upper zone for circulating waste water from said lower zone and aerating it in said upper zone, vertically extending first baffle means projecting from said sidewall into said mixing chamber, outer tank means having side and bottom walls spaced from said inner tank means and defining therewith lower and upper settling chambers, said inner tank means having a bottom opening for discharging treated waste material to the lower settling chamber, second baffle means in the lower settling chamber, means for removing clarified effluent from said upper settling chamber, and means for returning floating solid waste particles from the upper surface of the effluent in the upper settling chamber into the mixing zone of said aeration chamber at a vertical level above the waste water level therein.

2. The waste treatment plant according to claim 1, in which said sidewall of said inner tank means is arcuate in configuration, and said first baffle means projecting from said sidewall are of substantial depth.

3. The waste treatment plant according to claim 1, in which said inner tank means is spherical, and a plurality of said vertically extending first baffle means are laterally spaced and project radially into said aeration chamber.

4. The waste treatment plant according to claim 1, in which said double impellor means comprises a lower circulation impellor and an upper air impellor mounted in predetermined spaced relation for conjoint rotation.

5. The waste treatment plant according to claim 4, in which said upper and lower impellors have the same configuration and one being mounted in inverted position relative to the other for effecting opposite directions of thrust.

6. The waste treatment plant according to claim 4, in which said impellors are positioned within said mixing zone in a predetermined relationship to the static water level.

7. The waste treatment plant according to claim 4, in which said impellors are constructed and arranged to produce a cavitation effect upon the upper surface of the water level in said mixing zone whereby it is centrally depressed below the normal static water level to a point just above said upper impellor to produce a turbulent air induction to said waste water.

8. The waste treatment plant according to claim 7, in which said means for returning floating solid particles into the mixing zone comprises a skimmer having a horizontally disposed opening in the upper settling chamber adjacent to the static water level thereof, and a discharge opening positioned above the water level produced by cavitation in the mixing zone.

9. The waste treatment plant according to claim 8, in which said skimmer discharge opening is beveled angularly away from the direction of impellor rotation.

10. The waste treatment plant according to claim 1, in which said means for removing clarified effluent from said upper settling chamber comprises elongated conduit means extending across a substantial portion of said upper surface area of the upper settling chamber and having plural openings in the lower side thereof.

11. The waste treatment plant according to claim 10, in which said conduit means comprises a pair of angularly positioned conduits, and means for adjusting the pitch of said conduits to establish a horizontal position thereof.

12. The waste treatment plant according to claim 1, including a final treatment chamber for receiving clarified effluent from said means for removing same.

13. The waste treatment plant according to claim 1, in which said second baffle means extends angularly inwardly from said sidewall of said outer tank means adjacent to the bottom wall thereof to prevent rotational flow currents in said lower settling chamber.

14. The waste treatment plant according to claim 3, in which said second baffle means comprises plural baffle plates extending radially between the sidewall of said outer tank means and the spherical inner tank means.

15. The waste treatment plant according to claim 3, in which said outer tank means is cylindrical and said lower and upper settling chambers formed between said cylindrical outer and spherical inner tank means have an intermediate zone of restricted area to provide essentially quiescent zones immediately adjacent to the bottom and top levels of the effluent therein.